United States Patent
Bittner et al.

(10) Patent No.: US 7,770,598 B2
(45) Date of Patent: Aug. 10, 2010

(54) VALVE HAVING A MOVABLE VENTURI NOZZLE

(75) Inventors: Joerg Bittner, Laudenbach (DE);
Torsten Gerlich, Bensheim (DE);
Volker Daume, Hirschhorn (DE); Stefan Hettinger, Mutterstadt (DE); Klaus Bickel, Rimbach (DE)

(73) Assignee: Carl Freudenberg KG, Weinheim (DE)

( * ) Notice: Subject to any disclaimer, the term of this patent is extended or adjusted under 35 U.S.C. 154(b) by 217 days.

(21) Appl. No.: 11/999,635

(22) Filed: Dec. 6, 2007

(65) Prior Publication Data

US 2008/0149868 A1    Jun. 26, 2008

(30) Foreign Application Priority Data

Dec. 15, 2006   (DE) .................. 10 2006 059 776
Jan. 30, 2007   (DE) .................. 10 2007 005 488

(51) Int. Cl.
*F16K 1/06* (2006.01)
(52) U.S. Cl. ............... 137/630.15; 251/30.04; 251/129.15
(58) Field of Classification Search ............ 251/24, 251/30.04, 129.19, 129.15; 137/630.15
See application file for complete search history.

(56) References Cited

U.S. PATENT DOCUMENTS

| | | | | |
|---|---|---|---|---|
| 2,890,714 A | * | 6/1959 | Greenwood et al. .......... 251/24 |
| 3,590,886 A | * | 7/1971 | Judd ................ 137/630.15 |
| 3,961,645 A | * | 6/1976 | Kagan ............... 137/630.15 |
| 5,649,561 A | * | 7/1997 | Brandt .............. 137/115.13 |
| 5,711,583 A | | 1/1998 | Barreis et al. .......... 303/119.2 |
| 5,967,627 A | * | 10/1999 | Hosoya et al. ......... 303/119.2 |
| 6,209,970 B1 | * | 4/2001 | Kamiya et al. ......... 137/627.5 |
| 6,253,789 B1 | | 7/2001 | Krimmer et al. ........ 137/550 |
| 6,276,764 B1 | * | 8/2001 | Park ................ 303/119.2 |
| 6,363,920 B1 | * | 4/2002 | Parker et al. ......... 251/129.14 |
| 6,481,452 B2 | * | 11/2002 | Reuter et al. ......... 137/630.15 |
| 6,663,194 B2 | * | 12/2003 | Cheong ............. 251/129.19 |

FOREIGN PATENT DOCUMENTS

| | | |
|---|---|---|
| DE | 91 03 865 | 9/1992 |
| DE | 195 31 010 | 2/1997 |
| DE | 198 39 476 | 3/2000 |

* cited by examiner

*Primary Examiner*—John Bastianelli
(74) *Attorney, Agent, or Firm*—Pearl Cohen Zedek Latzer, LLP

(57) ABSTRACT

A valve includes a housing having an inlet (3), an outlet (1) and a movable sealing member (2) which allows the inlet (3) and the outlet (1) to be connected in fluid communication with each other, the sealing member (2) having associated therewith effective areas (4b) to which pressure can be applied, and sealing areas (4), and the sealing member (2) further having associated therewith a sealing seat (4a) for sealing the inlet (3) from the outlet (1). In order to provide a valve by which pressure can be relieved in a very short time, the sealing member (2) has associated therewith a conduit (2a) by which the inlet (3) and the outlet (1) can be connected in fluid communication with each other when the sealing member (2) rests on the sealing seat (4a).

4 Claims, 1 Drawing Sheet

VALVE HAVING A MOVABLE VENTURI NOZZLE

This application claims the benefit of German Patent Application No. 102006059776.1 filed Dec. 15, 2006, and of German Patent Application No. 102007005488.4, filed Jan. 30, 2007 and hereby both incorporated by reference herein.

The present invention relates to a valve including a housing having an inlet, an outlet and a movable sealing member which allows the inlet and the outlet to be connected in fluid communication with each other; the sealing member having associated therewith effective areas to which pressure can be applied, and sealing areas, the sealing member further having associated therewith a sealing seat for sealing the inlet from the outlet.

BACKGROUND INFORMATION

Valves of this kind are known from automotive applications. Such valves are frequently used to connect a tank to an activated carbon canister and are disposed in a purge line of a motor vehicle.

The valves are intended to relieve overpressures in the tank and to allow flow to the activated carbon canister. In this connection, it is frequently necessary to relieve an overpressure in as short a period of time as possible.

However, the valves of the type described do not satisfy these requirements.

SUMMARY OF THE INVENTION

In view of the above, it is an object of the present invention to provide a valve by which pressure can be relieved in a very short time.

The present invention provides a valve characterized in that the sealing member has associated therewith a conduit by which the inlet and the outlet can be connected in fluid communication with each other when the sealing member rests on the sealing seat.

In accordance with the present invention, it has been found that the combination of a movable sealing member with a conduit allows an overpressure to be quickly relieved. Initially, a reduction in the overpressure may be caused by opening the conduit. In a second step, the cross-sectional area of the flow channel effecting the reduction in pressure may be increased by moving the entire sealing member. Overall, therefore, an overpressure can thus be relieved in a very short time.

The conduit may be in the form of Venturi nozzle. This specific design makes it possible to limit the fluid flow through the conduit. The Venturi nozzle limits the volumetric flow rate to a maximum, thereby protecting components that are connected in fluid communication with the outlet. A Venturi nozzle is formed by a smooth-surfaced tubular member having two cones which are directed toward each other and merge into one another in the middle, at the point of smallest diameter. The Venturi nozzle creates a vacuum without any assistance being actively provided by a motor, and further causes an increase in the flow velocity at the narrowest point of the nozzle.

In view of this, the conduit may be in the form of a Laval nozzle. The cross-sectional area of a Laval nozzle first decreases, and then increases toward the gas outlet, whereby a fluid passing therethrough can be accelerated to supersonic velocity without producing strong compression shocks. Sonic velocity is reached exactly at the point where the cross-sectional area of the nozzle is smallest. This allows a fluid to be transported very rapidly through the conduit, thereby allowing an overpressure or a vacuum to be reduced.

The conduit may be formed in the sealing member. This results in a design which can be produced with few parts and is therefore inexpensive.

The conduit may be openable and closable by a movable, electromagnetically actuatable armature. This allows the valve to be controlled in a pulsed manner. Particularly preferably, the valve may be controlled by a pulse-width modulated signal at a frequency of 10 Hz. In the case of the pressures prevailing in vehicle tanks, this frequency turns out to be particularly suitable for the purpose of opening and closing the conduit in a manner that helps prevent damage to the material.

The sealing member may have two springs associated therewith. This allows a predefined pressure to be set as a threshold at which the sealing member is moved in its entirety, so that it opens a flow channel.

In view of this, it is conceivable to relieve vacuum pressures in the tank. A vacuum level set as a threshold may cause the sealing member to be attracted by suction, and thus moved, when the threshold is reached. More specifically, the threshold may be selected to be 100 hPa below atmospheric pressure. Once the vacuum in the tank falls to a value less than 100 hPa below atmospheric pressure, the sealing member may be moved, thus relieving the vacuum.

Advantageously, the valve could reduce an overpressure from 250 hPa to 200 hPa. Such pressures may occur in hybrid vehicles that use the pressurized tank concept.

Particularly preferably, the valve could reduce an overpressure from 300 hPa to 20 hPa in a maximum of 10 seconds. This can be achieved by the inventive combination of a conduit with a movable sealing member.

The valve described herein is preferably located in a purge line between a tank and an activated carbon canister. The valve disclosed herein can be used to advantage in hybrid vehicles having electric motors and internal combustion engines, because hybrid vehicles store pressure in the tank. This pressure can be accurately adjusted by the valve in a well-defined manner.

The teaching of the present invention may be advantageously embodied and refined in various ways. In this regard, reference is made, on the one hand, to the subordinate claims and, on the other hand, to the following description of a preferred exemplary embodiment of the inventive valve which makes reference to the drawing.

In conjunction with the explanation of the preferred exemplary embodiment with reference to the drawing, an explanation is also given of generally preferred embodiments and refinements of the teaching.

DETAILED DESCRIPTION

Figure 1:
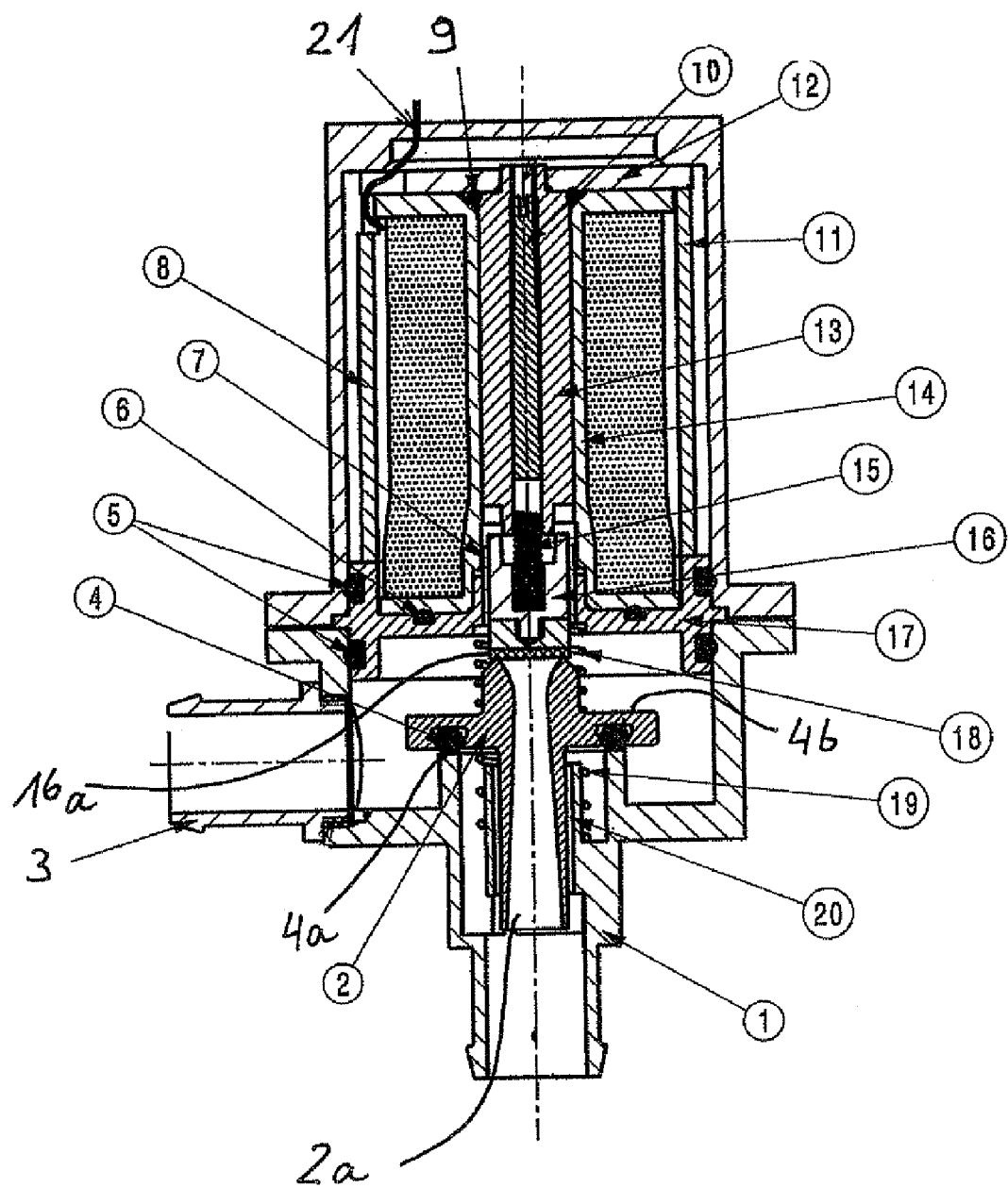
FIG. 1 of the drawing is a cross-sectional view of a valve having a movable sealing member which has a conduit associated therewith.

FIG. 1 shows a valve including a housing having an inlet 3, an outlet 1 and a movable sealing member 2 which allows inlet 3 and outlet 1 to be connected in fluid communication with each other.

Sealing member 2 has associated therewith effective areas 4b to which pressure can be applied, and sealing areas 4. Sealing member 2 further has associated therewith a sealing seat 4a for sealing inlet 3 from outlet 1. When sealing member 2 rests on the sealing seat, the fluid communication between outlet 1 and inlet 3 is blocked. Sealing member 2 has a sealing ring which engages the sealing seat 4*a*.

Sealing member 2 has associated therewith a conduit 2*a* by which inlet 3 and outlet 1 can be connected in fluid communication with each other when sealing member 2 rests on sealing seat 4*a*.

Conduit 2*a* is in the form of a Venturi nozzle. Venturi nozzle 2*a* is formed in sealing member 2. Sealing member 2 can move in its entirety within a guide channel 20 of outlet 1, the guide channel being surrounded by a spring 19.

Conduit 2*a*, which is in the form of a Venturi nozzle, is openable and closable by a movable, electromagnetically actuatable armature 16. The maximum fluid flow per unit time through conduit 2*a* can be defined by the geometric design of conduit 2*a*.

Armature 16 is magnetically actuated by an electrically powered coil 14 having an inner core 13. Coil 14 is supplied with electrical power through an electrical line 21. Coil 14 has return plates 8 and 11 and a return yoke 12 associated therewith. Return yoke 12 and inner core 13 together enclose a sealing ring 9. The coil rests on a pole plate 17. A sealing ring 6 is disposed between pole plate 17 and the coil. Pole plate 17 is sealed against the housing wall by sealing rings 5.

Armature 16 is guided in a guide bushing 7 and can be acted upon by a spring 15. The pressure applied by spring 15 to armature 16 can be adjusted by an adjusting screw 10. Armature 16 has associated therewith a sealing element 16*a* for sealing conduit 2*a*.

Sealing member 2 has two springs 18, 19 associated therewith. Inlet 3 is connected to a tank (not shown). The overpressure in the tank can be reduced by opening conduit 2*a*, namely by allowing fluid flow from the tank through outlet 1 to an activated carbon canister (also not shown).

It is also possible to reduce a vacuum in the tank by lifting sealing element 16*a* and thereby opening conduit 2*a*. When the pressure in the tank falls below a predefined threshold, the force of spring 19 exceeds the sum of the forces provided by spring 18 and the pressure acting on the effective area 4*b*. Then, spring 19 pushes sealing member 2 away from the sealing seat 4*a* (upward in the FIGURE), thereby increasing the total cross-sectional area of the fluid communication between inlet 3 and outlet 1.

Sealing member 2 can also be moved in its entirety even when armature 16 and sealing element 16*a* rest thereon, conduit 2*a* being closed by sealing element 16*a* during such process. This allows pressures to be reduced very rapidly.

In order to reduce very high pressure in a tank in accordance with the above-described principle, it is possible to flange-mount the tank to outlet 1 and to flange-mount the active carbon canister to inlet 3.

With regard to other advantageous embodiments and refinements of the teaching of the present invention, reference is made, on the one hand, to the general portion of the description and, on the other hand, to the appended claims.

Finally, it is especially emphasized that the above exemplary embodiment, selected entirely arbitrarily, is merely intended for purposes of discussing the teaching of the present invention, but not for limiting it to such exemplary embodiment.

What is claimed is:

1. A valve comprising:
    a housing having an inlet, an outlet and a movable sealing member allowing the inlet and the outlet to be connected in fluid communication with each other, the sealing member having associated therewith effective areas, pressure being applicable to the effective areas via fluid from the inlet, and sealing areas, and the sealing member further having associated therewith a sealing seat for sealing the inlet from the outlet,
    the sealing member having a conduit formed therein in the form of a Venturi nozzle or a Laval nozzle, the inlet and the outlet connectable in fluid communication with each other via the conduit when the sealing member rests on the sealing seat, and
    a sealing element for selectively blocking flow through the conduit wherein the sealing member has two springs, wherein the two springs include a first spring forcing the sealing member away from the sealing seat when a force of the fluid against the effective areas drops below a predetermined value and a second spring surrounding the first end of the sealing member forcing the sealing member towards the sealing seat and the first spring.

2. The valve as recited in claim 1 wherein the conduit is in the form of a Venturi nozzle.

3. The valve as recited in claim 1 wherein the conduit is in the form of a Laval nozzle.

4. The valve as recited in claim 1 wherein the conduit is openable and closable by a movable, electromagnetically actuatable armature.

* * * * *